United States Patent [19]

Kaufmann

[11] Patent Number: 4,836,111
[45] Date of Patent: Jun. 6, 1989

[54] THREE DIMENSIONAL MOVEMENT OF A ROBOT MANIPULATOR

[75] Inventor: Karl-Ernst Kaufmann, Wetter, Fed. Rep. of Germany

[73] Assignee: Mannesmann AG, Duesseldorf, Fed. Rep. of Germany

[21] Appl. No.: 71,634

[22] Filed: Jul. 9, 1987

[30] Foreign Application Priority Data

Jul. 9, 1986 [DE] Fed. Rep. of Germany ....... 3623506

[51] Int. Cl.$^4$ ............................................. E01B 25/00
[52] U.S. Cl. ...................................... 104/89; 104/247; 105/29.1; 105/163.1; 238/146; 238/281; 238/282; 414/751; 901/16
[58] Field of Search ......................... 414/751; 901/16; 104/247, 89; 105/163.1, 29.1; 238/132, 133, 126, 129, 146, 143, 281, 282

[56] References Cited

U.S. PATENT DOCUMENTS

| | | | |
|---|---|---|---|
| 2,822,094 | 2/1958 | Greer | 901/16 X |
| 3,391,652 | 7/1968 | Lauber | 104/247 |
| 3,884,363 | 5/1975 | Ajlouny | 414/751 X |
| 4,600,358 | 7/1986 | Graf | 901/16 X |

FOREIGN PATENT DOCUMENTS 12400 5/1881 Italy .................................... 238/146

*Primary Examiner*—Robert J. Spar
*Assistant Examiner*—Donald W. Underwood
*Attorney, Agent, or Firm*—Ralf H. Siegemund

[57] ABSTRACT

A system for moving a robot manipulator being mounted on a carriage over a track system which includes a pair of rail carriers for rails and being interconnected to extend parallel to each other in spaced apart relationship; a carrier carriage runs on these rails with unequally large rollers and the manipulator carriage runs on a rail on the carrier carriage; all of the rails are mounted by means of a plurality of nonstraightness compensating support bars being adjustably bolted to the rail carriers, at least two per carrier, as well as on the carrier carriage and in aligned relationship as to each carrier to establish straight rail mounting facilities.

12 Claims, 2 Drawing Sheets

THREE DIMENSIONAL MOVEMENT OF A ROBOT MANIPULATOR

BACKGROUND OF THE INVENTION

The present invention relates to guiding and controlling any movement and positioning of a manipulator running, by means of rollers, on a rail system; the rail system being suitably suspended; the manipulator being basically carriage or vehicle provided for connection with holding arm, the tool being a tool gripper, manipulator proper or the like.

Generally speaking, a device of the kind which the invention pertains is shown in German Pat. No. 3,243,335. The rails in such a system are parts of a carrier structure but owing to the large dimensions they must have, they cannot be made with the desired degree of accuracy except through impermissible high expenditure. A particular degree of precision, however, is required so that the vehicle can be moved into and assume positions in an accuracy in the millimeter range or below. The related application of common assignee, Ser. No. 053,358, filed May 22, 1987 (See also German patent application P 36 18 075.0) refers to a support and suspension system for rails and rail carriers on which the vehicle or one basically for one or two dimensional positioning. This application refers to the rail and rail carrier structure itself.

DESCRIPTION OF THE INVENTION

It is an object of the present invention to provide a new and improved guide and control system for a vehicle of a manipulator which improves the accuracy of positioning as compared with prior art structure.

In accordance with the preferred embodiment of the present invention, it is suggested to provide spaced apart rail support bars which in turn are fastened to carrier or carriers while the rails are adjustably fastened to these rail support. Particularly, the rail supports are fastened to the carrier in accurate aligned relationship whereby the spacing between the rail supports is determined by the load expected to occur on the rails as well as by the stability of these rails. Exactly positioning a vehicle that runs on these rails is always a presupposition for running through a sequence of positions and occurrences with the work program. The rail supports have ridges for receiving the respective rail in between. The rail supports have threaded bores into which plugs are inserted for spacing the rail support from the carrier for purposes of aligning the rail supports independently from lack of straightness of the carrier. The plugs have larger bores receiving fastening bolts so as to permit transversal shifting. It is apparent that in such a case a rail made in a rather simple fashion can be positioned very accurately upon a carrier even if the carrier is not particularly straight.

The ridges as provided to both sides of each respectively rail bar and at least for the upper, load carrying rail, are sufficiently high so that the rails can be connected laterally to these ridges by means of fasteners such as clamping pins, bolts or the like. The clamping pins may also serve as hinge for the rail supports and compensate also unevenness of the respective carrier so that the rail can be fastened without undergoing tension and without compromising straightness. For fastening the lower rail it is sufficient if they are just bolted to the rail support.

The rails are thrust proof connected to the carrier above and below and actually enhance the bending strength of the carrier owing to the relatively large distance from the zero line of the carrier so that providing these rails has an added advantage. Moreover, for increasing the accuracy of positioning of whatever vehicle runs on these rails there may be a gear rack provided for engaging opinion gear running with the vehicle.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE DRAWINGS

Figure 1:
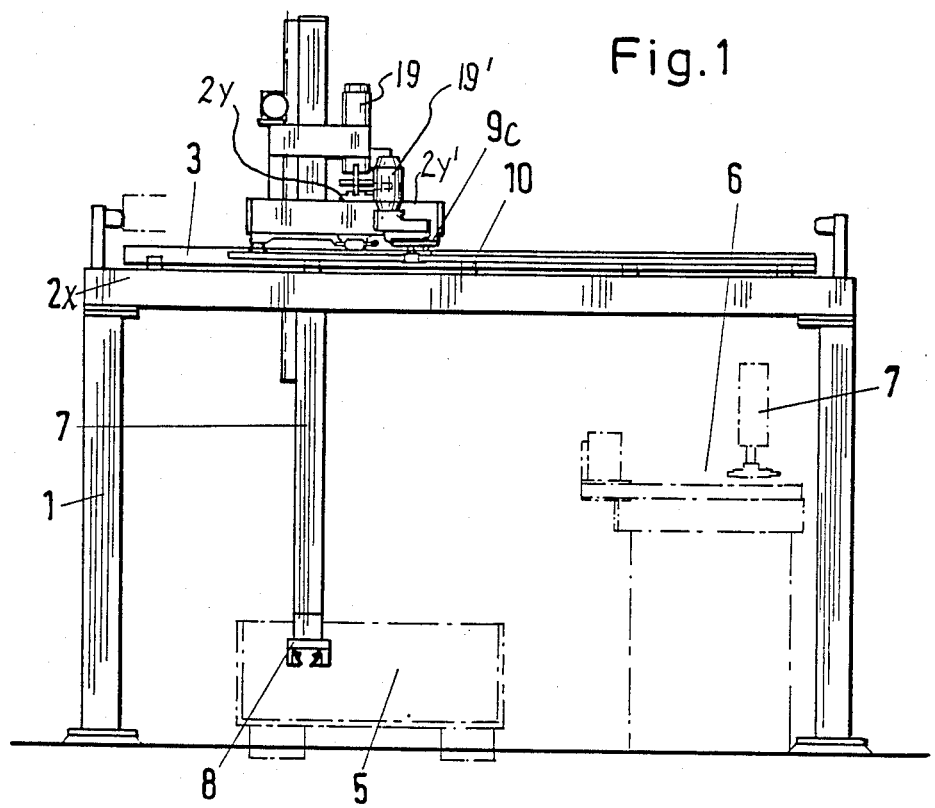
FIG. 1 is a front elevation of equipment constituting the preferred embodiment of the present invention for practicing the best mode thereof.

The figures show a manipulating vehicle and carriage 4 which also could be termed a robot or a vehicle on rails 3. In this specific example the vehicle 4 is also the support for an up and down movable arm 7 having a gripper or other manipulation means 8 or a tool at its end. This tool 8 is thus movable in three dimensions including up and down (z direction) by raising and lowering of arm 7; horizontally motion is possible in two dimensions (x and y) defined by the rail and carriage system to be described.

The vehicle carriage 4 runs on a single rail 3 which is mounted on a carrier $2y$ in what can be termed the y-direction from the y-track. This carrier $2y$ itself is a carriage and has rollers $9a$ and $9c$ respectively running on two parallel rails or rail bars 3 of carriers $2x$ and $2x'$ in what can be termed the x direction for the x-track. All these rail bars 3 are mounted on carriers such as $2x,2x',2y$. The carriers $2x$ and $2x'$ are supported by posts 1. Traverses $2'$ interconnect (and stiffen) the rail carriers $2x,2x'$. The support structure of posts 1 and of rail carriers 2 is shown and disclosed in greater detail in the above mentioned co-pending application, Serial No. 053,358.

In many instances, particularly where small parts are being worked on, or otherwise manipulated or the like, it is necessary to have the gripper 8 work with an accuracy of positioning of at least 1/10th of millimeter. This of course, is a requirement independent from any specific direction and must be realized in a two dimensional fashion. It is quite clear that only if the movement as provided in this orthogonal system for the vehicle 4 is absolutely straight within that degree of accuracy and in both directions X and Y it is possible to achieve such an accuracy of positioning; the relatively large load bearing carrier 2 are hypothetically amenable to accuracy of making them for meeting these requirements but the expenditure is prohibitive. On the other hand, rail bars or just rails 3 can be made straight in a relatively simple fashion through drawing. The requisite accuracy of position is attained in accordance with the invention in that the rails 3 are supported through relatively short rail support bars 10 in spaced apart position as shown in FIG. 1 so that the rails 3 will not bend and by means of these support bars 10 the rails are supported absolutely straight on the carriers 2 even though the latter are not, as far straightness is concerned, that accurate.

FIGS. 3-6 show details of the rail mounting whereby particularly the mounting of the rail 3 on the intermediate carrier-carriage 2y is chosen for illustration, but the other rails are mounted analogously. The carrier-carriage 2y has an upper and a lower rail system (3,3a). The rail carriers 2x,2x' could also be provided for an upper and lower rail system but are not because the two upper rails or carriers 2x,2x' avoid tilting.

Figure 4:
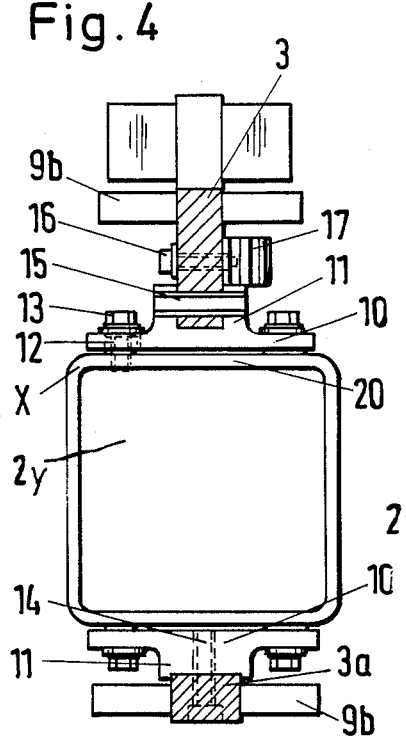
FIG. 4 is an enlargement of a portion shown in FIG. 3.
Figure 5:
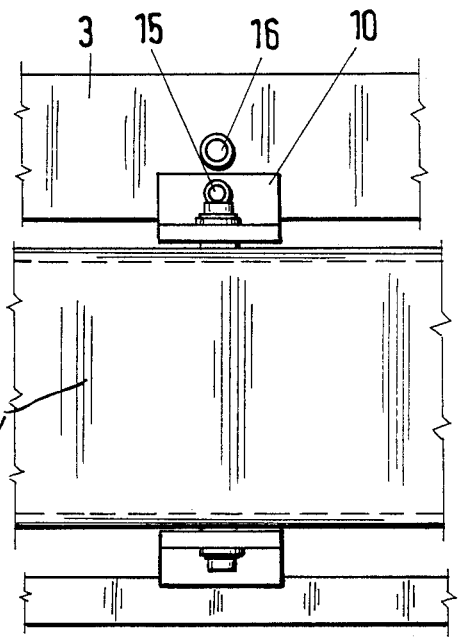
FIG. 5 is a side elevation of the illustration of FIG. 4.

Turning to particulars of the rail or carriage 2y the upper rail 3 thereon is the main load carrying rail for the vehicle 4 and has a particular rectangular cross-section while the lower rail 3a provides mainly guiding function and is of relatively low height. Lateral guiding rollers 9b of carriage 4 bear with a play against the sides of the rails 3 and 3a. The rails 3,3a are positioned and received between guide bar portions 11 of the respective rail support 10. FIGS. 4 and 5 show specifically the fastening of the upper load carrying and the guiding rails 3 by means of the rail supports 10 on the carrier 2. The rail supports 10 have a high guide bar 11 for the rail 3 and that rail is fastened between the guide bars 11 by means of clamping sleeves 15. These clamping sleeves 15 permit accurate positioning of the rail 3 even if the support 10 is somewhat skewed on a not straight carrier 2.

All of the rail supports 10 are provided with threaded inserts or plugs 12 (Fig.6) being arranged transversely to the respective rail carrier 2. They are provided for laterally orienting the rails 3, 3a of the respective carrier. Passage bores 12a are provided in the plugs 12 for being passed through by fastener screws 13 by means of which the rails 3, or 3a as the case may be, are indirectly fastened to the respective carrier 2 that may not be straight. Specifically, the plugs 12 penetrate the rail supports 10 entirely and lift them from the carrier 2 under formation of a more or less wide gap 20. Through this gap then any unstraightness of carrier 2 (versus the straightness of the rail 3) is compensated. The bores 12a in the plugs 12 are approximately 20% larger than the diameter of the screws 13 so that this way one can also laterally adjust the rail 3 on the carrier 2.

Figure 2:
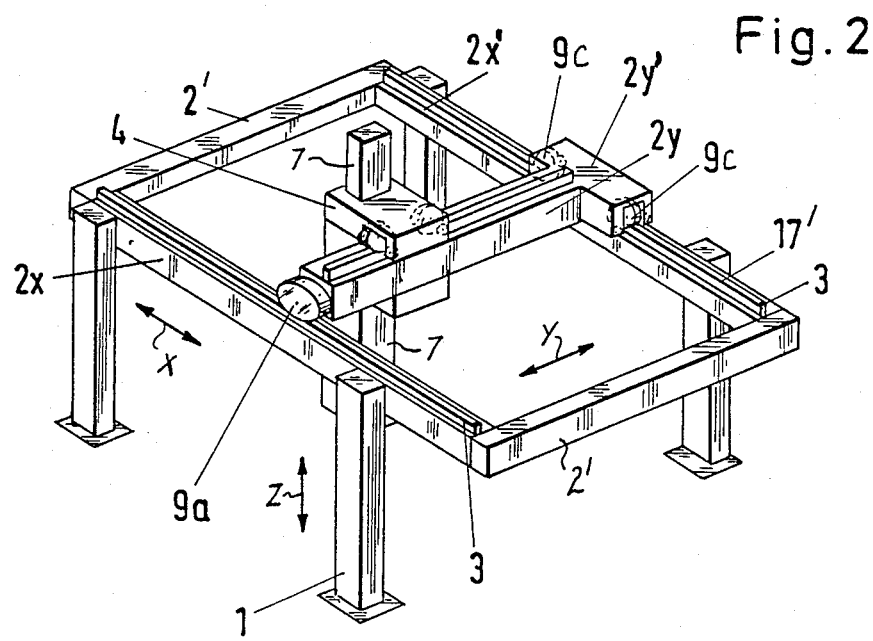
FIG. 2 illustrates the same device shown in FIG. 1 in a perspective view from above one side and the rear.
Figure 3:
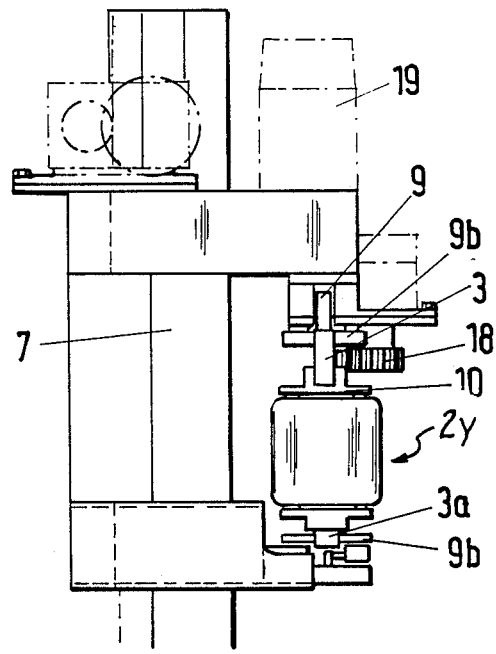
FIG. 3 is a cross-section through an intermediate carrier included in the system shown in FIGS. 1 and 2 showing also parts of the vehicle running on that rail carrier.
Figure 6:
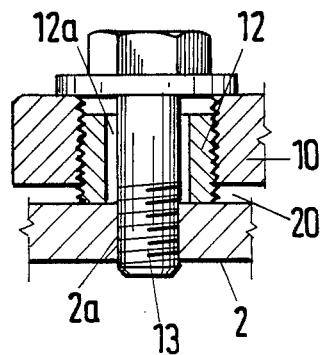
FIG. 6 shows a detail X as indicated in FIG. 4 on an enlarged scale.

As stated, the lower rail 3a basically provides for a guiding function, ultimately for guiding the lifting post 7 to the work. The lower rail 3a moreover may just be fastened by means of screws or bolts 14 (FIG. 4) between the guide bars or ridges 11 of the lower rail support bar 10. The carriers 2x and 2x' in this case are not provided with a lower rail. However to the rail 3 of the carrier 2x' is provided a rack bar 17. As far as driving the vehicle is concerned, the rack 17 is provided as part of the rail system and fastened by means of bolts 16 on one of the rails (e.g.3) or next to it, to engage a pinion 18 driven by a drive motor 19. That motor 19 drives the vehicle 4 on the rail 3 of the intermediate carriage 2y. The carriage 2y has a supplementary carriage 2y' for the two rollers 9c. Carriage 2y' is driven by a motor 19' driving a pinion that meshes rail 17' next to rail 2x'. Note that the motors 19 and 19' are omitted in FIG. 2.

The two rollers 9c in the subcarriage 2y are larger than the single roller 9a on the front end of carrier 2y. As a consequence there is less resistance on that side of the carriage 2y that is not driven, for avoiding skewed movement thereof. This way one can make sure that the gripper 17 is accurately positioned. The exact positioning of the gripper is thus the result of mounting the rails 3 (3a) in a straightness establishing manner by aligning the rail receiving support bars 10 and further owing to the rack and pinion drive. By means of the drives 19 and 19' it takes only one half a second for the bearing 4 to come up to a speed of 120 m/min and it will then be moved to the desired portion with an accuracy of 0.1 mm. Workpieces and equipment being moved may weight up to 50 kg.

The invention is not limited to the embodiments described above but all changes and modifications thereof, not constituting departures from the spirit and scope of the invention, are intended to be included.

I claim:

1. In a system for moving a manipulator mounted on carriage means, the combination comprising:
 a carrier for a rail bar being preferably of hollow section type configuration, and being generally straight but with a relatively high tolerance as to straightness;
 a plurality of rail support bars being spaced apart as mounted to the carrier but in true alignment for adapting for lack of straightness of the carrier and establishing low tolerance straight mounting surfaces;
 each support bar having a plurality of threaded bores, there being threaded plugs each with an opening respectively in said bores;
 bolt means traversing the openings with play but clamping the respective support bar in relation to the carrier; and
 a straight rail bar mounted on said plurality of support bars for said carriage means to run on, said rail bar being kept straight as mounted.

2. The combination as in claim 1, said support bars each having two ridges for mounting said rail bar in between.

3. The combination as in claim 2, said rail bar being bolted to said ridges.

4. The combination as in claim 2, said rail bar being bolted to support portions of the support bars in between the respective ridges.

5. The combination as in claim 1, the plugs projecting from the respective support bar to establish an adjustable gap between the respective support bar and the carrier, to thereby compensate for carrier unevenness.

6. The combination as in claim 1, there being a rack bolted to the rail bar, the carriage means provided with drive means for a pinion, meshing the rack for driving the carriage along the rail bar.

7. The combination as in claim 1, there being rollers laterally engaging the rail bar.

8. In a system for moving a manipulator mounted on a carriage, a track system comprising:
 a first and a second rail carrier mounted and interconnected to extend parallel to each other in spaced apart relationship;

a carrier carriage;

a plurality of nonstraightness compensating support bars mounted on the rail carriers, at least two per carrier, as well as on the carrier carriage and in aligned relationship as to each carrier to establish straight rail mounting facilities;

a first, second and third rail bar means respectively mounted to said first and second rail carriers and the carrier carriage by means of the support bars;

each support bar having a plurality of threaded bores, there being threaded plugs each with an opening respectively in said bores;

bolt means traversing the openings with play but clamping the support in relation to the respective one of the carriers; and said carrier carriage running on the first and second rail bar means, the carriage running on the third rail bar means.

9. A track system as in claim 8 the plugs projecting from the respective support bar to establish an adjustable gap between the respective support bar and the carrier to thereby compensate for carrier unevenness.

10. In a system for moving a manipulator mounted on a carriage, a track system comprising:

a first and a second rail carrier mounted and interconnected to extend parallel to each other in spaced apart relationship;

a carrier carriage;

a plurality of nonstraightness compensating support bars mounted on the rail carriers, at least two per carrrier, as well as on the carrier carriage and in aligned relationship as to each carrier to establish straight rail mounting facilities;

a first, second, and third rail bar means respectively mounted to said first and second rail carriers, and the carrier carriage by means of the support bars;

the carrier carriage having one portion with two rollers running on the first rail bar means and another portion with a single roller running on the second rail bar means;

a drive motor driving said one portion; and the carriage running on the third rail bar means.

11. A track system as in claim 10, there being a rack on the first rail bar means meshing a pinion driven by the drive motor.

12. A track system as in claim 10, the single roller being larger than the two rollers.

* * * * *